Sept. 28, 1965    J. F. BRINSTER ETAL    3,209,264
MULTIPLE OUTPUT SEQUENTIAL SIGNAL SOURCE
Original Filed April 28, 1958    5 Sheets-Sheet 1

JOHN F. BRINSTER    Inventors
WALTER C. JOHNSON

By Ralph K. Bonell  Agent

Sept. 28, 1965  J. F. BRINSTER ETAL  3,209,264
MULTIPLE OUTPUT SEQUENTIAL SIGNAL SOURCE
Original Filed April 28, 1958  5 Sheets—Sheet 2
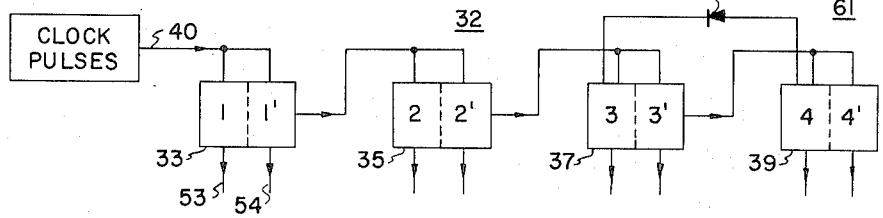
Fig. 5
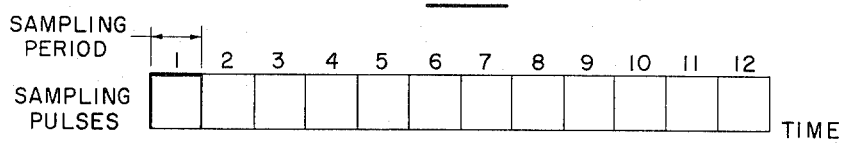
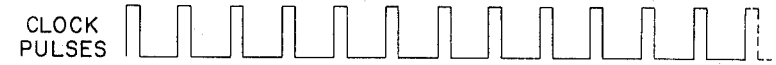
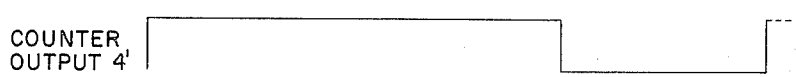
Fig. 6
JOHN F. BRINSTER  Inventors
WALTER C. JOHNSON
By Ralph K. Borell  Agent Sept. 28, 1965   J. F. BRINSTER ETAL   3,209,264
MULTIPLE OUTPUT SEQUENTIAL SIGNAL SOURCE
Original Filed April 28, 1958
| SAMPLING PULSE CHANNEL NO. | COUNTER OUTPUTS COMBINED | | | | | | | |
|---|---|---|---|---|---|---|---|---|
| | 1 | 1' | 2 | 2' | 3 | 3' | 4 | 4' |
| 1 | | × | | × | | × | | |
| 2 | × | | | × | | × | | |
| 3 | | × | × | | | × | | |
| 4 | × | | | × | | × | | |
| 5 | | × | | | × | × | | × |
| 6 | × | | | | × | × | | × |
| 7 | | × | × | | × | | | × |
| 8 | × | | | × | | × | | × |
| 9 | | × | | × | | | × | |
| 10 | × | | | × | | | × | |
| 11 | | × | × | | | | × | |
| 12 | × | | | × | | | × | |
Fig. 7
| SAMPLING PULSE CHANNEL NO. | CONNECTIONS TO BUSSES | | | | | | |
|---|---|---|---|---|---|---|---|
| | 1,2 | 1',2 | 1,2' | 1',2' | (3)4 | 3,4' | 3'(4') |
| 1 | | | | × | | | × |
| 2 | | | × | | | | × |
| 3 | | × | | | | | × |
| 4 | × | | | | | | × |
| 5 | | | | × | | × | |
| 6 | | | × | | | × | |
| 7 | | × | | | | × | |
| 8 | × | | | | | × | |
| 9 | | | | × | × | | |
| 10 | | | × | | | × | |
| 11 | | × | | | | × | |
| 12 | × | | | | | × | |
Fig. 10
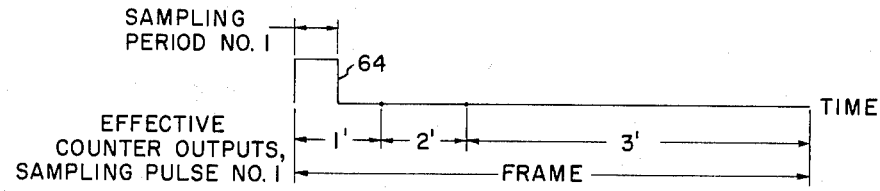
Fig. 8A
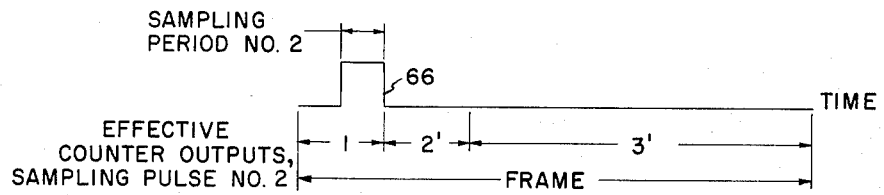
Fig. 8B
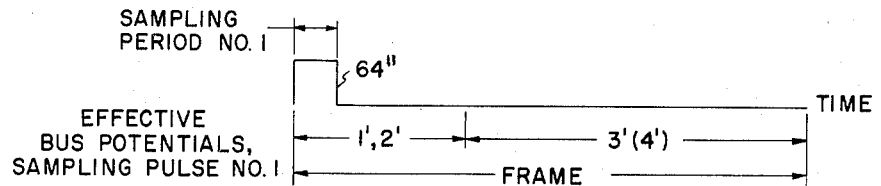
Fig. 11
JOHN F. BRINSTER   Inventors
WALTER C. JOHNSON
By Ralph K. Bonell   Agent Sept. 28, 1965  J. F. BRINSTER ETAL  3,209,264
MULTIPLE OUTPUT SEQUENTIAL SIGNAL SOURCE
Original Filed April 28, 1958  5 Sheets-Sheet 4

JOHN F. BRINSTER  Inventors
WALTER C. JOHNSON

By *Ralph K. Boxell* Agent

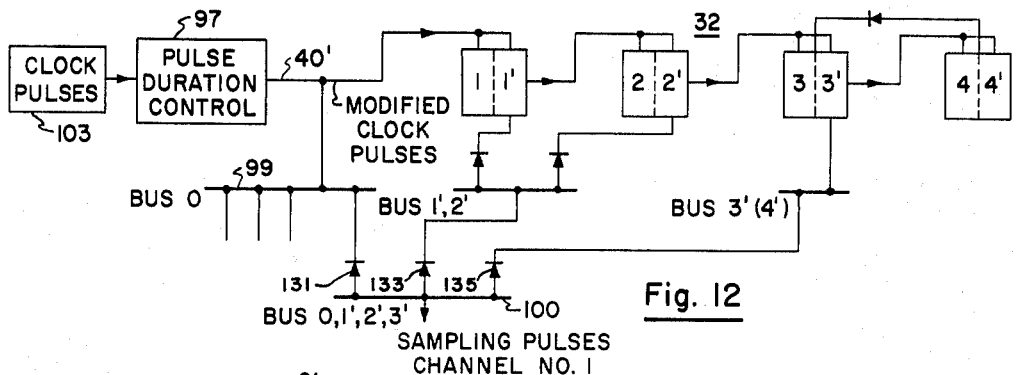
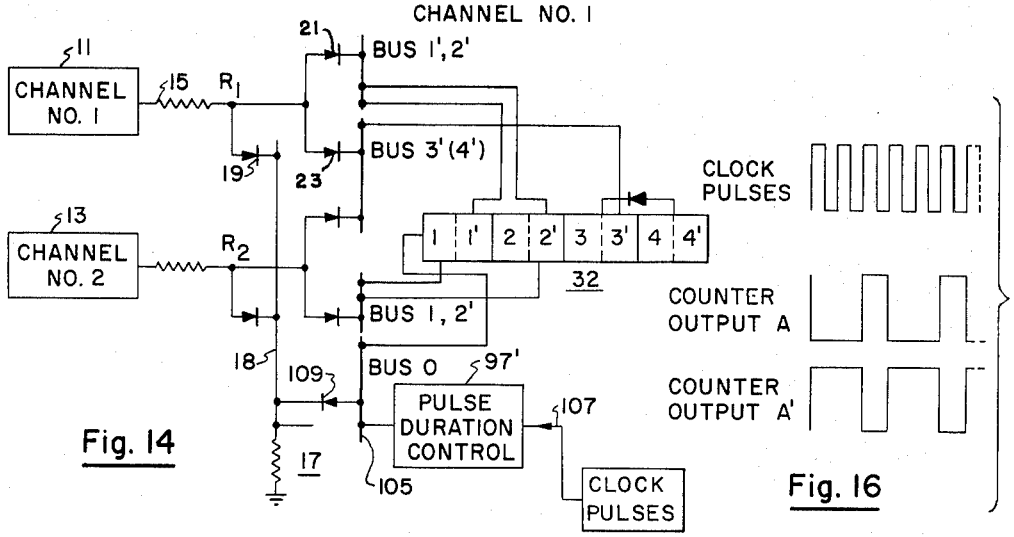
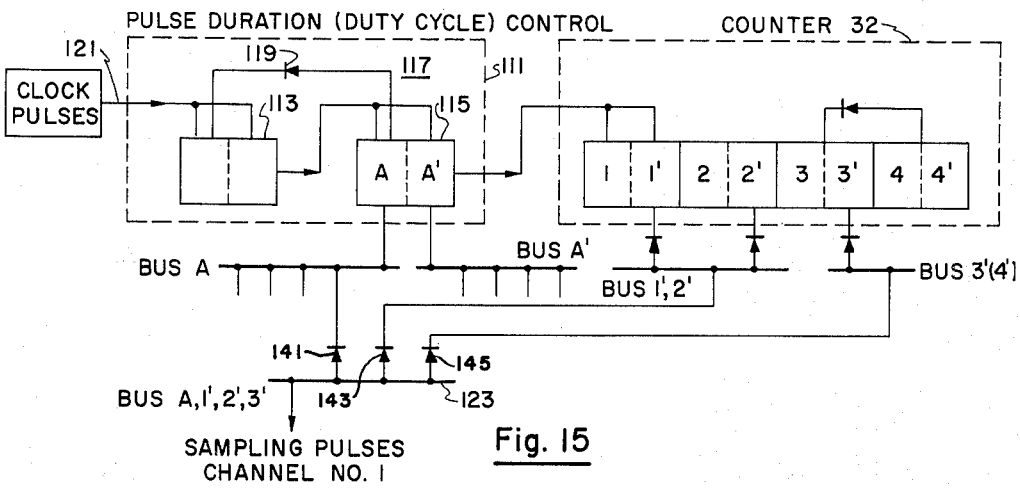

United States Patent Office

3,209,264
Patented Sept. 28, 1965

3,209,264
MULTIPLE OUTPUT SEQUENTIAL SIGNAL SOURCE
John F. Brinster and Walter C. Johnson, Princeton, N.J., assignors to General Devices, Inc., Princeton, N.J., a corporation of New Jersey
Original application Apr. 28, 1958, Ser. No. 731,507, now Patent No. 3,052,871, dated Sept. 4, 1962. Divided and this application July 24, 1962, Ser. No. 212,082
18 Claims. (Cl. 328—58)

This is a division of application Serial No. 731,507, filed April 28, 1958, now U.S. Patent No. 3,052,871.

The invention of the present application relates to electrical circuit means for producing a plurality of electrical impulses in selected time sequence, which impulses may serve as the agency for effecting the repeated sampling of the electrical signals of a plurality of information channels. More particularly, it refers to the provision of circuit means for controlling the duty cycle or duration of such sampling impulses and of the signal samples produced thereby.

An earlier application for patent in the names of the present inventors entitled, "Multi-Signal Sampling Circuit," Serial No. 712,576 filed, January 31, 1958, now U.S. Patent No. 2,958,857, discloses a switching or sampling circuit in the operation of which the times of occurrence and the duration of the periods over which sampling is performed are controlled by recurrent sequences of short pulses, each pulse being formed by combining selected portions of two or more time-displaced periodic voltage waves of like period. Circuit means for forming such pulses, particularly from a polyphase A.C. supply, are further disclosed in another application for patent in the names of the same inventors filed concurrently with said last-named application, entitled, "Pulse Sequence Generator," Serial No. 712,575, filed January 31, 1958 now U.S. Patent No. 2,861,202.

In the circuits of the above two cited patents certain circuit elements which have the function of selecting the portions of the voltage waves that are combined to form the sampling pulses appear in circuit once for each use of a wave in forming such a pulse. Thus, if two diode rectifiers, for example, are required to form a pulse from a combination of portions of two voltage waves, three rectifiers are required in combining three waves and the total number of rectifiers required is the sum of those required to form each pulse of the sequence. In an improvement over such earlier circuits which is disclosed in said application Serial No. 731,507 and shown herein, the number of circuit elements of like character required to effect the formation of the sampling pulses does not necessarily increase in proportion to the total number of times the several voltage waves are used in combination but may increase at a lesser rate, thereby effecting a possible saving in the cost of these elements themselves and a saving in their interconnection, together with a reduction in the space occupied by the assembled apparatus. The invention of the present application constitutes a further improvement in sampling circuits in that it provides means permitting the ready adjustment of the duty cycle or duration of the recurrent sampling pulses, and thus of the signal samples themselves.

Accordingly, it is an object of the invention to provide a multiple output sequential signal source of improved design and of decreased cost.

It is another obejct to provide signal sampling apparatus wherein sampling pulses are derived from a plurality of periodic voltage waves with improved efficiency in the use of circuit elements.

It is another object of the invention to provide apparatus of the above character in the operation of which the generated sampling pulses are periodic in character and their duty cycle or duration is readily adjustable.

A further object is to provide apparatus of the above character which may also serve to distribute to a plurality of output circuits sequences of pulses occurring at a common input.

These and other objects and advantages of the invention will be more clearly appreciated upon consideration of the following description of certain preferred forms which the invention may take, further illustrated by the accompanying drawings in which:

FIG. 5 is a block diagram of a binary counter comprising a feed-back connection and a plurality of output connections;

FIG. 6 is a series of wave diagrams relating to the operation of the counter of FIG. 5;

FIG. 7 is a table showing the connections required to form sampling pulses for a twelve channel system, according to the circuit arrangements of FIG. 1;

FIGS. 8A and 8B are diagrams respectively illustrating the formation of two successive sampling pulses of a frame through the operation of the circuit of FIG. 1;

FIG. 10 is a table of connections relating to the circuit of FIG. 9;

FIG. 11 is a diagram illustrative of the formation of pulses by means of the circuit of FIG. 9;

FIG. 12 is a modification of the circuit of FIG. 9, providing for sampling pulse duty cycle or duration control;

FIG. 14 is a modification of the circuit of FIG. 12, showing additional circuit elements;

FIG. 15 shows another modification of the circuit of FIG. 12; and

FIGS. 16, 17A and 17B are wave diagrams illustrative of the operation of the circuit of FIG. 15.

Figure 1:
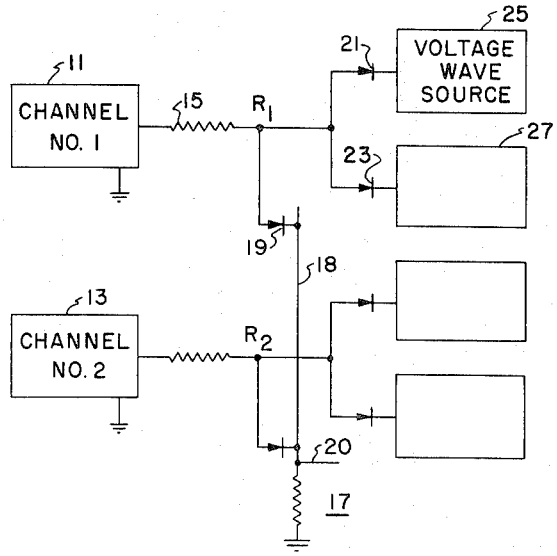
FIG. 1 is a diagram illustrating a general type of circuit in which the invention finds utility.

By way of illustration of one type of switching or sampling circuit with which the present invention is concerned there is shown in FIG. 1 (generally similar in arrangement to FIG. 7 of said Patent No. 2,958,857) a source 11 of the signal of a No. 1 information channel and a source 13 of a No. 2 channel signal. In certain applications provision may be made for sampling 30 to 50 or more such signals in repeated sequence, one complete sequence of signal samples, and also the period thereof, being referred to herein as a "frame," in conformity with television and like terminology.

Source 11 is connected to a junction point $R_1$ by a lead including a resistor 15. The variable potential of point $R_1$ is the prototype of the sampled No. 1 channel signal transmitter to output circuit 17 by way of rectifier 19, as will be further explained. Point $R_1$ is, in addition, connected to terminals of like character of two diode rectifiers 21 and 23, polarized as shown. The opposite terminals of rectifiers 21 and 23 are connected to sources 25 and 27, respectively, which supply the two voltage waves that in the illustrated case are combined to form the channel No. 1 sampling pulses. Similar circuit means are provided to form the other sampling pulses and to supply in sequence to circuit 17, over lead 18, the sampled signals of the other channels resulting from their operation. The sequence, within a frame, in which the sample signals of the various channels appear in circuit 17, as on lead 20 thereof, is determined by the time sequence in which the several sampling pulses are formed.

Figure 2A:
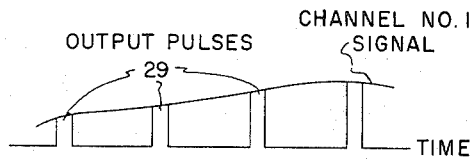
FIGS. 2A and 2B are wave diagrams illustrated of the operation of the circuit of FIG. 1.
Figure 3A:
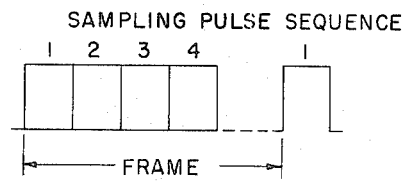
FIGS. 3A and 3B are diagrams showing the type of sampling pulses that are utilized in the circuit of FIG. 1 and certain disclosed modifications thereof.
Figure 2B:
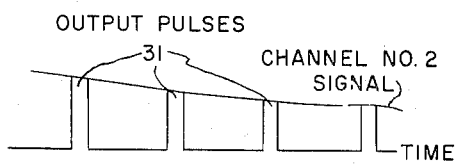
Figure 3B:
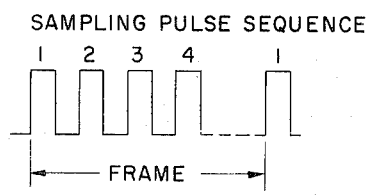

The operation of the circuit of FIG. 1 in sampling signals of assumed form of the two channel waves there shown is illustrated, for positive-going signals, by the wave diagrams of FIGS. 2A and 2B. Assuming the impedance of voltage wave sources 25 and 27 to be low compared to the combined impedance of source 11 and resistor 15, then when either of these sources 25 or 27 is at or below ground potential the associated diode rectifier, 21 or 23 as the case may be, is in a conducting condition and point $R_1$ also is at or below ground potential. At such time substantially zero voltage appears in output circuit 17. When, however, the voltage waves of sources 25 and 27 simultaneously have values more positive than that of the signal, diodes 21 and 23 both are rendered substantially non-conducting and the potential of $R_1$ rises to a value proportional to the signal value. The portion of the variable potential of point $R_1$, appearing at circuit 17 constitutes the sample No. 1 channel signals or pulses 29, seen in FIG. 2A. The similarly generated No. 2 channel sample signals or pulses 31, displaced to a later time relative to No. 1 channel signals 29, are seen in FIG. 2B. It is to be noted that the controlling portions of the voltage waves furnished by sources 25 and 27 are those which successively, at each instant, have the more negative value and it may be considered that it is a combination of these more negative portions, which in effect constitutes the periodically repeated sampling pulses. This formation of sampling pulses is later described herein with reference to FIGS. 8A and 8B and other figures. The sequence of sampling pulses in a frame, without pulse separation (100 percent duty cycle), is shown, by way of example, in FIG. 3A and with pulse separation (less than 100 percent duty cycle) in FIG. 3B. In the figures herein no absolute value is assigned to the upper or lower levels of the several waves illustrated since this is adjustable by the use of a bias. Thus, as is sometimes desirable, the sample signal output may have a negative pedestal or a lower level below ground potential when the sampled signal has zero value.

Figure 4:
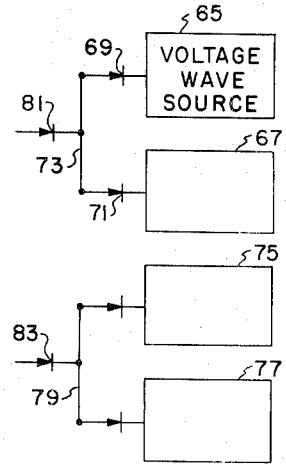
FIG. 4 is a modification of a portion of the circuit of FIG. 1 illustrating the pre-combination of supply voltage waves.

The voltage waves supplied by sources 25 and 27 and their counterparts in the cases of the other channels may, in general, have any periodic form. These are the primary waves to be combined in building the sampling pulses. In previously cited Patent No. 2,958,857 the combination of waves which comprise pulses of rectangular shape is referred to and is illustrated in FIG. 4 of said patent. Sources furnishing waves of this form are assumed in describing the operation of the circuits disclosed herein. These waves are termed, for convenience, "square waves" and their component pulses are characterized as of "square" form, regardless of their duty cycle or the relationship of amplitude to duration.

In certain of the embodiments of the invention described herein which, as above, will be referred to as signal sampling circuits, although obviously not limited to such use, the waves that are combined to form the sampling pulses are considered for purposes of description to originate at a series of busses or junction points the potentials of which, in certain cases, may be the result of an earlier combination of two or more square waves. The primary voltage waves of which such pre-combinations and ultimate combinations are made may directly or indirectly be derived from a binary counter or counters actuated by recurrent "clock" pulses, advantage being taken in such case of the square waves of different duration and timing which characterized the potentials at different points along a binary counter chain. Transistorized bistable elements are the preferred form of counting units in the chain, on the basis of space efficiency and for other reasons.

As an example of an arrangement adapted to generate pulses for sampling the signals of a twelve channel system, there is shown in FIG. 5 a counter 32 comprising a chain of four binary counting units, 33, 35, 37, and 39, each adapted to supply in known manner, by means of suitable connections, two square wave outputs of opposite phase when the chain is driven by recurrent input "clock" pulses on lead 40. In the block diagram representation of the figure the two halves of a counting unit respectively capable of supplying these two outputs are distinguished by the use of unprimed and primed numerals, as 1, 1', 2, 2', etc. The same numerals are used herein in referring to the respective outputs themselves. Further, for conciseness, these numerals are at times applied to the stable states of the binary units which result in outputs therefrom of selected sign. The sign convention followed in such cases is that where a binary stable state is identified by a particular numeral, it is that state in which the output of the binary half also identified by that numeral is more positive than the output of the other half, Thus, state 1' implies that at a given instant output 1' of binary 33 on lead 54 is more positive than output 1 on lead 53. According to this notation the state of the entire counter at some particular time might be designated as: 1', 2, 3, 4', meaning that the outputs of the binary halves respectively designated by these numerals are simultaneously positive, relative to the associated outputs of the coacting binary halves.

Binary unit 33 is actuated by positive-going clock pulses appearing on lead 40, each of which produces a change of state of the unit, and supplies a positive-going switching pulse from the half thereof designated 1' to binary 35 upon the occurrence of alternate clock pulses, the other binary units (in the absence of modifying means) counting down with a scale of 2 in similar conventional manner. Since the chain of FIG. 5 comprises four binary units, the scale for the entire chain would be 16 were it not for a feedback connection 61 from binary half 4 to binary half 3, by way of diode rectifier 63 polarized as shown. Suitably applied in known manner, as later referred to, this connection, which illustrates means for binary counting with a scale other than a power of 2, reduces the combined scale of binary 37 and binary 39 from 4 to 3, the over-all counter scale then being $2 \times 2 \times 3 = 12$. Scale changing means other than the illustrated feedback connection are known.

In general, a counter of $n$ binary counting units can supply a maximum of $2^n$ distinctive combinations of the outputs of the binary halves thereof. In counting with a scale which is not a power of 2, a feedback connection or its equivalent renders certain of these combinations impossible of existence. In the circuit of FIG. 5, assuming that the active elements of the counting units are p-n-p transistors with the feedback connection 61 made between the collectors of the transistors in binary halves 4 and 3 by way of rectifier 63, then, among other results, this insures that the output of binary half 3 is always positive when that of 4 is positive, and thus makes it impossible for the output of 3', the other half of binary 37, to be positive at such time. In the adopted notation which identifies the state of a binary unit with the number assigned to the output therefrom, when positive, this can be expressed by saying that no state of counter 32 as a whole is possible in which the combination 3', 4 appears. The counter merely skips these states.

The waveforms of the several outputs supplied by counter 32 (assumed to be of like amplitude) are shown in FIG. 6, together with the clock pulses that actuate the counter. In this figure the chosen origin of time (at the left of the wave diagrams) is the instant when the counter is about to assume the state 1', 2', 3', 4'. The waveforms of outputs 1, 1' and 2, 2' of binary units 33 and 35, respectively, appear in the figure as in the case of normal binary counting but the duration and relative timing of outputs 3, 3' and 4, 4' of binary units 37 and 39, respectively, are affected by the feedback connection 61.

The table of FIG. 7 shows the groupings of the outputs derived from counter 32 which enter into the formation of the twelve sampling pulses per frame required in the presently considered example and the wave diagrams of FIGS. 8A and 8B respectively illustrate the formation of the first and second pulses of a frame. For example, it is seen in FIG. 8A, considered in connection with FIG. 6, that output 1' of the half of binary 33 similarly designated, forms the positive-going pulse 64; which occupies a complete sampling period, and that subsequently, as indicated, outputs 2' and 3' are effective to hold the sampling wave level at zero (or other selected reference potential) for the remainder of the frame. This is in accordance with the explanation of the operation of the circuit of FIG. 1, and particularly of the wave-combining rectifiers therein, where it was noted that it is the relatively most negative portions of the combined primary voltage waves, as these waves vary with time, that, pieced together, form the contours of the sampling pulses. In FIG. 8B the second sampling pulse 66 of a frame is seen to be formed by counter output 1 while outputs 2' and 3' maintain zero level during the remaining period of the frame. For the duration of each sampling pulse applied to a channel the circuit is conditioned to transmit the signal of that channel to the output circuit.

In following through the formation of the various sampling pulses, again with reference to the wave diagrams of FIG. 6, it will be found that the portion of a frame during which output 4 is negative includes the portion during which output 3 is negative, and that, relatively, output 4 is always at least as negative as 3. Hence, in pulse formation, the blanking or zeroing effect of the negative or low level portions of output 3 can as well be obtained by the use of output 4. Similarly, output 3' is always at least as negative as 4'. This is expressed herein by enclosing in parenthesis the numeral designating the included superfluous output, as (3)4 and 3'(4'). Advantage may be taken of this relationship to simplify the wiring of the sampling pulse circuit.

If sampling pulse formation for a twelve channel system were carried out by means of a circuit of the type of FIG. 1 the connections to the various counter outputs would be as shown in the table of FIG. 7, different numbers of waves being here combined in forming different sampling pulses in a frame. Since each connection to a counter output requires a rectifier, as rectifier 21 of FIG. 1, the total number of combining rectifiers in this case would be 40. This is the number called for in the straight-forward method of connection of the prior art. It may be seen, however, that certain groupings of outputs are used more than once, as the combinations 1', 2'; 1, 2', etc. In FIG. 4 there is shown an example of a circuit arrangement for effecting precombinations of counter output wave groups such that the successively most negative portions of the combined waves appear as the potentials of a series of busses or junction points which may be considered to constitute new sources, comparable to the original binary halves, which are available for supplying square waves for further combination. Thus, the voltage waves supplied by sources 65 and 67 are combined, through the operation of rectifiers 69 and 71, respectively, to supply the variable potential of bus 73, which like the combined waves, is a square wave. Similarly, the waves supplied by sources 75 and 77 are combined as the potential of bus 79. In the ultimate formation of the sampling pulses, the square waves of busses 73 and 79 may then be combined, as to their relatively more negative portions, by way of rectifiers 81 and 83, respectively.

It is found that the use of such pre-combinations of two or more voltage waves results in a saving in the total number of rectifiers required (usually crystal diodes) which saving, generally, is greater the greater the number of channels sampled per frame. In FIG. 4 the pre-combination of only two voltage waves is shown but, in systems comprising a large number of channels pre-combinations of a greater number of waves to supply the various pre-combination bus potentials may prove advantageous, from the standpoint of circuit element economy.

Figure 9:
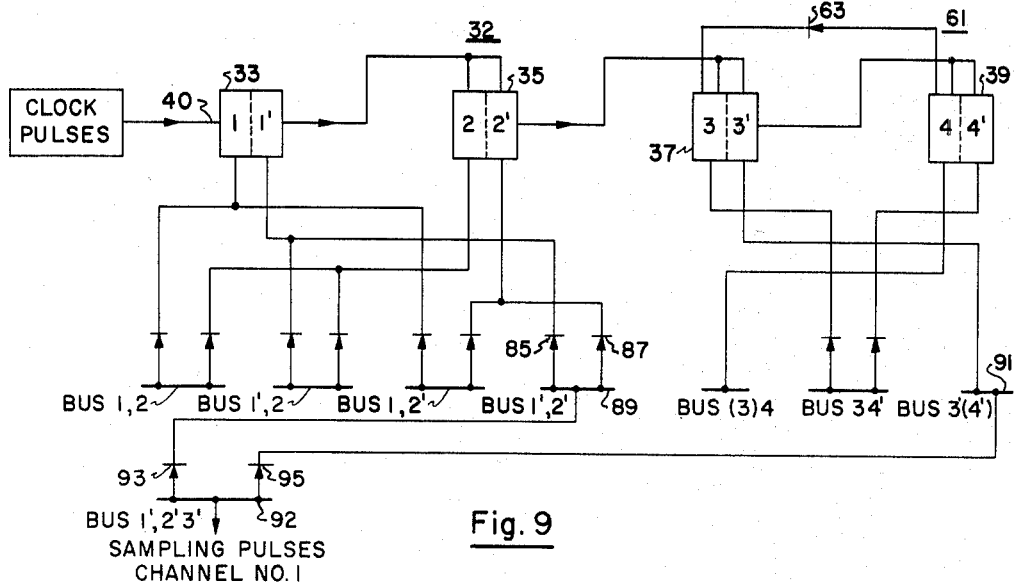
FIG. 9 is a diagram of a modification of the circuit of FIG. 1 in accordance with the principles of the invention providing for pre-combination of certain of the supply voltage waves.

FIG. 9 shows a circuit arrangement adapted for effecting pre-combinations of waves in a twelve channel sampling system in accordance with the principles of the invention and according to one scheme of wave combination, the same outputs of counter 32 (FIG. 5) being employed as are combined by the connections listed in the table of FIG. 7. Other schemes may be adopted. The connections for ultimately forming the sampling pulses for channel No. 1, only, are shown in FIG. 9, to simplify the diagram. Thus, outputs 1' and 2' are combined, as to their more negative portions, by way of rectifiers 85 and 87 to supply the potential of bus 89. The square waves of busses 89 and 91, the latter supplied by output 3'(4'), then are combined by way of rectifiers 93 and 95, respectively, at bus 92 to form the No. 1 channel sampling pulses. Other sampling pulses comprising the wave combination 1', 2' are formed by connection to bus 89 instead of by separate connections to the primary wave sources energizing that bus. FIG. 11, analogous to FIG. 8A, shows the bus potentials effective over the period of a frame in forming a channel No. 1 sampling pulse 64" in this manner.

The table of FIG. 10 shows the connections to the several busses of FIG. 9, either pre-combination busses or busses supplied by a single counter output, that are required to form the twelve sampling pulses per frame of the present example, using the type of circuit generally illustrated by FIG. 4. The saving in rectifiers made in this example may be reckoned as follows: Without effecting pre-combinations of waves, a total of 40 connections, each including a diode rectifier, is required (FIG. 7). This is in accordance with prior art. In the arrangement of FIG. 9, an improvement in accordance with the principles of the invention, there are required 10 diodes to supply the potentials of the pre-combination busses and, as seen in the table of FIG. 10, there are required 24 connections, each including a diode, to combine these potentials and those of the single wave busses (3)4 and 3'(4'), making a total of 34 diodes. While only 6 diodes are saved in the relatively simple circuit here selected by way of example, the saving increases rapidly and may become very large with increase in the number of sampled channels, particularly where it is possible to employ pre-combinations of more than two waves.

*Duty cycle control*

The principle of the pre-combination of voltage waves and the availability of pre-combination busses in apparatus making use of this principle make it a relatively simple matter to adjust or control the duty cycle of the sampling pulses, that is, the proportion of the assigned full sampling period per channel occupied by these pulses. This is an adjustment of the time duration of the pulses. On the top line of FIG. 6 there is shown a sequence of 100 percent duty cycle sampling pulses such as might result, for example, from employment of the connections of FIG. 9. Each pulse occupies the entire space representing the period available for sampling a channel. The signal samples obtained from their operation likewise will have a 100 percent duty cycle so that the signals of successively sampled channels, as they appear in the output circuit, are unspaced, one from another. The circuit modifications of FIGS. 12, 14 and 15 show arrangements for obtaining duty cycles of less than 100 percent.

In FIG. 12 again only the connections for forming the pulses for sampling the No. 1 channel signal are shown, to simplify the diagram. The connections for forming the other pulses of a frame are similar. As seen in this figure, "Modified Clock Pulses" are supplied by Pulse Duration Control 97 to lead 40', corresponding to lead 40 of FIG. 5, and a connection is made from this lead to a bus or junction point 99, designated bus 0 in the figure, which is comparable to the combined wave buses of FIG. 9, two of which, busses -'2' and 3'(4'), also appear in FIG. 12. The sampling pulse for channel No. 1 is then formed by means of connections to busses 0; 1',2'; and 3'(4'), respectively, and appears at bus 100, which is designated bus 0, 1', 2', 3'. The principle according to which the waves derived from bus 0, bus 1'2', and bus 3'(4') are combined is the same as that described in detail in connection with the more simple arrangement of FIG. 1. Thus, through the operation of rectifiers 131, 133, 135, which have a function similar to that of rectifiers 21, 23 of FIG. 1, the contour of the resultant wave appearing at bus 100 is determined by selecting at each instant the value of that component wave which has the greatest amplitude of negative sign.

Figure 13:
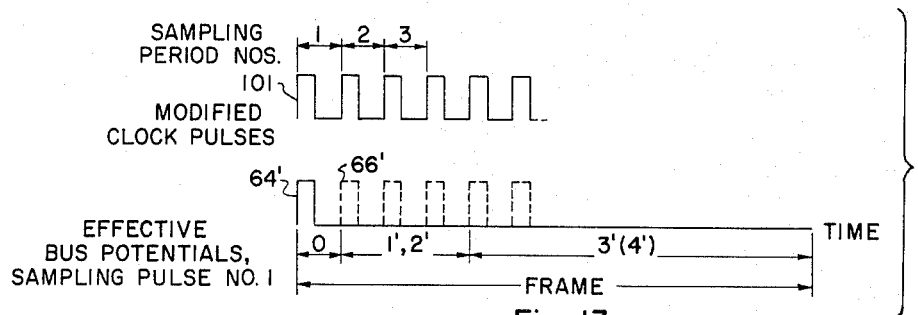
FIG. 13 is a series of wave diagrams illustrative of the operation of the circuit of FIG. 12.

Referring to FIG. 13, the top line shows the wave of Modified Clock Pulses which includes pulse 101. These pulses have a width or duration less than that of a full sampling period for one channel while for the remainder of the period the pulse wave is at its herein unassigned lower level. Pulse Duration Control 97 (FIG. 12) which supplies the Modified Clock Pulses as an output, may have a variety of forms, one known form being a monostable multivibrator which permits a continuous adjustment of output pulse width. A different means for discontinuous adjustment of pulse width, is described later herein.

Whenever the voltage or potential wave at bus 99 of FIG. 12 (bus 0) has the most negative value of the waves 0, 1', 2', 3' (FIG. 12) combined at bus 100, it becomes the controlling factor in the formation of the No. 1 channel sampling pulses, as described. The bottom line of FIG. 13 illustrates the effect of this wave in decreasing the duration of the sampling pulse for channel No. 1 to a value less than a full assigned channel sampling period. A similar effect is achieved through the use of the bus 0 wave in forming the other pulses of a frame, as indicated by the dashed-line pulses of the diagram. The different portions of a frame over which the several combined voltage waves are effective in forming the complete wave of the first sampling pulse are identified in FIG. 13 in the same way as in FIG. 11.

A second circuit modification providing for sampling pulse duty cycle control, and one that requires fewer circuit elements than that of FIG. 12, is seen in FIG. 14. This figure is similar to the complete sampling circuit of FIG. 1 in that it indicates the sources of the channel signals and the path for supplying the sample signals to the common output or load circuit 17 which includes lead 18. Here, the voltage wave of bus 105, designated bus 0 in correspondence with FIG. 12, is derived from a repetitive clock pulse input on lead 107 by way of Pulse Duration Control 97', which may have any of the features referred to in connection with similar means 97 of FIG. 12 and which likewise produces output pulses of selectively less duration than a complete channel sampling period. The voltage wave of bus 105 is applied to lead 18 of the common output circuit by way of rectifier 109, polarized as shown. There it is combined with and modifies the form of each of the sample channel signals as they appear in sequence on lead 18, instead of being combined with the individual sample signals before they reach a common path as described in connection with FIG. 12. Otherwise the operation of the two circuits is closely alike and this can be followed in the described operation of the circuit of FIG. 1.

FIG. 15 presents a further circuit modification affording sampling pulse duty cycle control. Here there is shown instead of or as a modification of Pulse Duration Control 97 of FIG. 12, a binary counter circuit 111 which precedes counter 32 of FIG. 12, for instance. Circuit 111 includes two binary counting stages 113 and 115, respectively, together with a feedback connection 117, comprising rectifier 119, which reduces the combined counting scale of the two units to 3, in the manner previously referred to in connection with counter 32. Circuit 111 is driven by clock pulses on input lead 121 and binary unit 115 thereof supplies output pulses for driving counter 32 and also supplies two outputs from the halves thereof respectively designated A and A', these last outputs, as before, each being referred to by the letter of the binary half producing it.

Figure 17A:
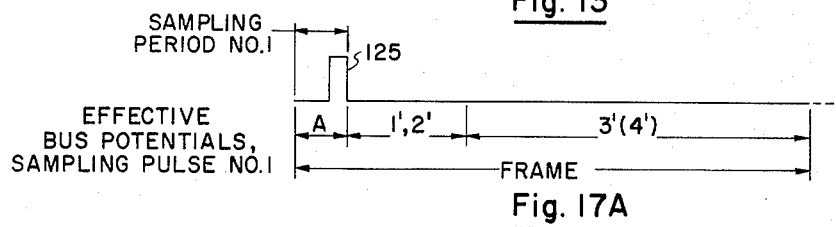
Figure 17B:
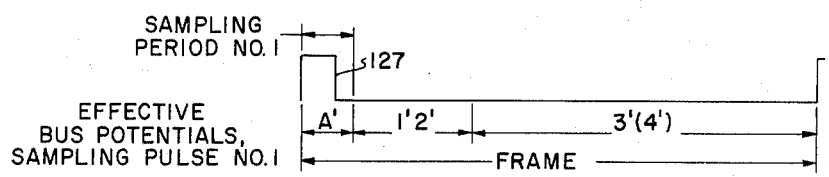

The wave forms of a partial sequence of clock pulses of assumed duration on lead 121 and of resultant counter outputs A and A', are shown in FIG. 16, on the top and bottom lines, respectively. The formation of the counter outputs occurs in the manner described in connection with those of counter 32. It will be found by following through a similar analysis here that the pulses of outputs A and A' have a duration which is one third of that of the outputs of binary halves 1 and 1' of counter 32, the latter duration being the complete sampling period per channel. When the connections of FIG. 15, including rectifiers 141, 143 and 145, are used to combine counter outputs A, 1', 2' and 3' at bus 123, according to the described principle of the selection of the most negative wave value, the sampling pulse formed (the first pulse of a frame) may be as shown in FIG. 17A. This pulse 125 occupies one-third of the complete sampling period, or has a 33⅓ percent duty cycle. If the output of binary half A' is used for combining purposes instead of that of half A, by connection to bus A', then the sampling pulse formed, pulse 127 of FIG. 17B, will occupy two-thirds of the complete sampling period, a duty cycle of 66⅔ percent. Thus, by utilizing various counter circuit arrangements ahead of the previously described counter 32 of FIG. 12 and other figures, sampling pulse duty cycles can be obtained which divide the complete sampling period per channel into complementary fractional parts as: ½ and ½; ⅓ and ⅔; ¼ and ¾; etc. In terms of practical circuit assemblies this means that a basic sampling circuit can be made up to give 100 percent duty cycle sampling pulses, using the equivalent of counter 32, and then the output of this circuit can be modified, as to duty cycle, merely by adding the requisite pre-counter circuit, with suitable connections thereto.

The descriptions herein of certain forms which the invention may take, and of their operation, have made reference to the sampling of positive-going information signals and the supplying of positive-going output sample pulses. It will be recognized that this is compatible with the illustrated polarizations of the various rectifiers employed but that other rectifier polarizations will render the described circuits suitable for the sampling and supply of other types of pulses.

Also, where complete sampling or switching circuits have been shown herein they have been described as serving to collect samples of the signals of a plurality of sources and to assemble them as a sequence of pulses in a common output circuit. The same circuit means, however, may operate in converse manner to receive a sequence of pulses as an input and distribute these pulses to a plurality of output circuits, which is analogous to the dual use to which a mechanical commutator may be put. Thus, referring to the circuit of FIG. 1 by way of illustration, a sequence of pulses appearing on lead 20 of circuit 17, now serving as an input circuit, may be distributed to outputs occupying the circuit positions of means 11 and 13 through the agency of what have heretofore been called sampling pulses produced by a combination of suitable voltage waves, as by a combination of the waves supplied by sources 25 and 27.

The embodiments of the invention described herein are illustrative, only, of a wide variety of forms which the invention may take and are not by way of limitation of the scope of the invention, as set forth in the appended claims.

What is claimed is:

1. In circuit means for forming sequences of pulses by combining portions of periodic voltage waves of generally square wave form the combination which comprises a supply of first recurrent pulses of predetermined periodicity; a counting circuit having a chain of bistable binary counting units each adapted to supply, responsive to the counting of periodic pulses, two periodic square wave output voltages respectively comprising similar pulses of square wave form and of opposite sign whose duration is an integral multiple of the repetition period of the counter actuating pulses; means for supplying a sequence of actuating pulses as an input to said counting circuit at the periodicity of said first recurrent pulses; means for deriving from said first recurrent pulses other recurrent pulses of square wave form having a duration less than that of the output waves of the first counting unit in the chain of said counting circuit; and means for combining said other recurrent pulses with at least one of said output waves of the units of said counting circuit, including means for selecting as the value of the combination at each instant the value of that wave of the combination having the greatest amplitude of a constant predetermined sign.

2. The combination defined in claim 1 wherein said means for deriving other recurrent square wave pulses from said first recurrent pulses includes means alternatively operable to provide pulses of two durations, the sum of said durations being the duration of the pulse components of said output waves of the first counting unit of said counting circuit.

3. The combination defined in claim 1 wherein said means for deriving other recurrent square wave pulses from said first recurrent pulses includes means for receiving pulses of the duration of said first recurrent pulses and delivering pulses of adjustably different duration.

4. The combination defined in claim 3 wherein the duration of said last mentioned pulses is continuously adjustable.

5. In circuit means for forming sequences of similar pulses of square wave form by combining portions of periodic voltage waves each comprising pulses of square wave form whose durations and spacings are integral multiples of a basic period, the combination which comprises a supply of pulses recurrent at said basic period; a first counting circuit actuated by said pulses and having a chain of bistable binary counting units each adapted to supply, responsive to such actuation, two periodic square wave output voltages comprising similar pulses of square wave form and of opposite sign whose duration is an integral multiple of said basic period, a second counting circuit actuated by an output from the last counting unit of said first circuit and having a chain of bistable binary counting units respectively adapted to supply two square wave output voltages similar in form to those of the units of said first circuit; means for combining the square wave output voltages of said second counting circuit as to selected groups thereof including means for selecting at each instant the portion of the wave of the selected group then having the greatest amplitude of a constant predetermined sign; and means for combining in similar manner one of the square waves voltage outputs of the counting units of said first counting circuit with each wave formed by combining outputs of the units of said second counting circuit.

6. The combination defined in claim 5 wherein a succession of counting units in the chain of at least one of said two counting circuits is constructed to count to a scale other than an integral power of two.

7. In a multi-signal sampling circuit for producing an electrical output comprising sequences of spaced-apart pulses respectively proportional in amplitude to the correspondingly existing values of a plurality of variable electrical signals, the combination which comprises a plurality of sources of signals to be sampled; a plurality of sources of voltage waves comprising pulses of square wave form; rectifiers of a first class having a terminal of like character of each connected to one of said voltage wave sources; intermediate circuit means commonly connecting terminals of opposite character of selected groups of said rectifiers to said signal sources, respectively; rectifiers of a second class having a terminal of like character of each connected to one of said intermediate circuit means intermediate the group of commonly connected rectifiers of the first class and the signal source in circuit connection therewith; means constituting a common connection for all terminals of opposite character of said rectifiers of the second class, the variable potential at said common connection forming a voltage wave comprising pulses of square wave form resulting from combinations of the voltage waves of said sources thereof by means of said rectifiers of the first class; a source of a voltage wave comprising square wave pulses of lesser duration than that of said last mentioned square wave pulses; and circuit means connecting said last mentioned source to said common connection for rectifiers of the second class including a rectifier polarized relative to current from said last mentioned source similarly to said rectifiers of the second class relative to current from said intermediate circuit means.

8. The combination defined in claim 7 wherein said last mentioned voltage wave source is adapted of delivering a voltage wave comprising uniform pulses of adjustable duration.

9. In a circuit for obtaining sequences of periodic square waves of a selected duty cycle by combining portions of the waves of a plurality of other sequences of square waves the combination which comprises
   (a) sources of a first and of a second sequence of periodic square waves having respective repetition rates that are in integral relationship,
   (b) means for adjusting the duration of the waves supplied by one of said sources without change of the repetition rate thereof, and
   (c) means for combining portions of the waves of said two sequences to obtain a third sequence of square waves, including means for selecting as the value of the combination at each instant the value of that component wave having the greatest amplitude of a constant predetermined sign.

10. In a circuit for obtaining sequences of periodic square waves of a selected duty cycle by combining portions of the waves of a plurality of other sequences of square waves the combination which comprises
   (a) a multi-stage binary counting circuit,
   (b) means supplying as an input thereto a sequence of square waves of adjustable duration, and
   (c) means for combining portions of the outputs of selected stages of said counting circuit with waves of the periodicity and duration of said input thereto, including means for selecting as the value of the combination at each instant the value of that component wave having the greatest amplitude of a constant predetermined sign.

11. The combination in accordance with claim 10 wherein said counter is constructed to count to an integral scale other than a power of two.

12. In a circuit for obtaining sequences of periodic square waves of a selected duty cycle by combining portions of the waves of a plurality of other sequences of square waves the combination which comprises
   (a) a source of periodic clock pulses,
   (b) means for deriving from said pulses a sequence of modified pulses of like repetition rate but of an adjustable duration, (c) means supplying a plurality of sequences of square waves, the durations of the respective waves of the several sequences each being in integral relationship to the period of said clock pulses, and (d) means for combining portions of the waves of selected ones of said sequences and said modified clock pulses, including means for selecting as the value of the combination at each instant the value of the component wave having the greatest amplitude of a predetermined sign.

13. In a circuit for obtaining repeated sequences of adjustable duty cycle samples of the variable signals of a multi-channel information transmission system the combination of (a) means supplying a sequence of periodic square waves of adjustable duration, (b) means supplying a plurality of sequences of periodic square waves of a duration constant in each sequence but differing in the several sequences, the repetition rates of said adjustable and constant duration waves being in integral relationship, (c) means for combining portions of said adjustable duration waves and of selected ones of said constant duration waves in a plurality of arrangements equal in number to the number of channels of said system to obtain sequences of a like number of sampling pulses, including means for selecting as the value of a combination at each instant the value of that component wave having the greatest amplitude of a constant predetermined sign, and (d) means for applying said several sampling pulses to the circuits of said channels, respectively, for sampling purposes, including means jointly actuated by a channel signal and a sampling pulse and supplying as an output a signal sample having a value proportional to that of the channel signal and a duration equal to that of the sampling pulse.

14. The combination in accordance with claim 13 wherein said means for supplying a plurality of sequences of periodic square waves is a multi-stage binary counting circuit driven by the output of a source of clock pulses, the several sequences of constant duration waves being outputs available at the several stages of the counting circuit.

15. The combination in accordance with claim 14 wherein said counting circuit is constructed to count to an integral scale other than a power of two.

16. In a circuit for obtaining repeated sequences of adjustable duty cycle samples of the variable signals of a multi-channel system the combination of (a) means supplying a sequence of periodic square waves of adjustable duration, (b) means supplying a plurality of sequences of square waves of a duration constant in each sequence but differing in the several sequences, the repetition rates of said adjustable and constant duration waves being in integral relationship, (c) means for combining portions of said adjustable duration waves and of selected ones of said constant duration waves in a plurality of arrangements equal in number to the channels of said system to obtain sequences each comprising a like number of adjusted duty cycle sampling pulses having a spacing in time defining a sampling period, including means for selecting as the value of a combination at each instant the value of that component wave having the greatest amplitude of a predetermined sign, and (d) means for combining said sampling pulses with the signals of said various channels, respectively, to obtain samples of said signals.

17. The combination according to claim 16 wherein said means supplying a sequence of square waves of adjustable duration is adapted to supply waves of a continuously adjustable duration within the limits of said sampling period.

18. The combination in accordance with claim 16 wherein said means supplying a sequence of square waves of adjustable duration is adapted to supply waves of a plurality of durations whose sum is equal to said sampling period.

References Cited by the Examiner

UNITED STATES PATENTS

| | | | |
|---|---|---|---|
| 2,563,589 | 8/51 | Hertog. | |
| 2,632,880 | 3/53 | Flowers | 328—104 X |
| 2,840,306 | 6/58 | Steele | 179—15 |
| 2,986,092 | 7/59 | Pugsley | 307—88.5 |
| 2,913,528 | 11/59 | Hertog et al. | 328—104 X |
| 2,926,242 | 2/60 | Feyzeau | 328—58 X |
| 2,953,694 | 9/60 | Wilson | 307—88.5 |
| 3,080,526 | 3/63 | Porter | 179—15 |

JOHN W. HUCKERT, *Primary Examiner.*

JAMES D. KALLAM, ARTHUR GAUSS, *Examiners.*